(12) United States Patent
Zhai et al.

(10) Patent No.: US 11,378,761 B2
(45) Date of Patent: Jul. 5, 2022

(54) OPTICAL MODULE

(71) Applicant: InnoLight Technology (Suzhou) LTD., Jiangsu (CN)

(72) Inventors: Xiongfei Zhai, Jiangsu (CN); Long Chen, Jiangsu (CN); Yuzhou Sun, Jiangsu (CN)

(73) Assignee: InnoLight Technology (Suzhou) Ltd., Suzhou (CN)

( * ) Notice: Subject to any disclaimer, the term of this patent is extended or adjusted under 35 U.S.C. 154(b) by 0 days.

(21) Appl. No.: 16/994,130

(22) Filed: Aug. 14, 2020

(65) Prior Publication Data

US 2021/0055487 A1 Feb. 25, 2021

(30) Foreign Application Priority Data

Aug. 20, 2019 (CN) .......................... 201921355848.0

(51) Int. Cl.
- *G02B 6/14* (2006.01)
- *G02B 6/42* (2006.01)
- *H04B 10/60* (2013.01)

(52) U.S. Cl.
CPC ......... *G02B 6/4215* (2013.01); *G02B 6/4214* (2013.01); *H04B 10/60* (2013.01)

(58) Field of Classification Search
CPC ..... G02B 6/4215; G02B 6/4214; H04B 10/60
USPC ........................................................ 385/33
See application file for complete search history.

(56) References Cited

U.S. PATENT DOCUMENTS

| | | | |
|---|---|---|---|
| 6,328,484 B1* | 12/2001 | Uebbing | G02B 6/4246 385/47 |
| 9,739,962 B2* | 8/2017 | Brenner | G02B 6/4214 |
| 9,847,434 B2* | 12/2017 | Ho | G02B 6/4246 |
| 2002/0033979 A1* | 3/2002 | Dair | G02B 6/428 398/164 |
| 2002/0064191 A1* | 5/2002 | Capewell | G02B 6/29367 372/14 |
| 2004/0042736 A1* | 3/2004 | Capewell | G02B 6/4215 385/89 |
| 2004/0264838 A1* | 12/2004 | Uchida | G02B 6/43 385/14 |

(Continued)

FOREIGN PATENT DOCUMENTS

CN 104422998 A 3/2015

*Primary Examiner* — Kaveh C Kianni
(74) *Attorney, Agent, or Firm* — Finnegan, Henderson, Farabow, Garrett & Dunner, LLP

(57) ABSTRACT

An optical module includes a housing extending in a lengthwise direction, as well as a main circuit board and an optical receiver assembly disposed in the housing. A plane on which the main circuit board is located is parallel to the lengthwise direction of the housing. The optical receiver assembly includes a receiver-end fiber optic port, at least two sets of receiver-end photoelectronic chips arranged side by side along the lengthwise direction, and a receiver-end optical component set including an optical demultiplexer and at least two coupling components located at an exit end of the optical demultiplexer. The at least two coupling components are arranged side by side along the lengthwise direction, and have different distances, respectively, to the plane on which the main circuit board is located along a first direction perpendicular to the plane on which the main circuit board is located.

10 Claims, 2 Drawing Sheets

(56) References Cited

U.S. PATENT DOCUMENTS

| | | | |
|---|---|---|---|
| 2008/0285910 A1* | 11/2008 | Yamada | H05K 3/4691 |
| | | | 385/14 |
| 2011/0235963 A1* | 9/2011 | Benzoni | G02B 6/423 |
| | | | 385/14 |
| 2014/0151585 A1* | 6/2014 | Hung | G01J 1/0266 |
| | | | 250/578.1 |
| 2015/0055665 A1* | 2/2015 | Nakajima | H04J 14/0213 |
| | | | 370/542 |
| 2015/0256259 A1* | 9/2015 | Huang | H04B 10/25891 |
| | | | 398/88 |
| 2015/0293316 A1* | 10/2015 | Sun | G02B 6/4246 |
| | | | 385/14 |
| 2016/0266322 A1* | 9/2016 | Epitaux | G02B 6/138 |
| 2017/0090130 A1* | 3/2017 | Meadowcroft | G02B 6/4245 |
| 2017/0168252 A1* | 6/2017 | Pezeshki | G02B 6/428 |
| 2018/0058845 A1* | 3/2018 | Arai | A61B 8/54 |
| 2018/0183523 A1* | 6/2018 | Beas Bujanos | H04J 14/0293 |
| 2019/0166684 A1* | 5/2019 | Bird | H01S 5/02469 |
| 2019/0278035 A1* | 9/2019 | Pezeshki | G02B 6/421 |
| 2020/0295836 A1* | 9/2020 | Ishii | H04J 14/02 |
| 2021/0194206 A1* | 6/2021 | Raring | H04B 10/503 |

\* cited by examiner

OPTICAL MODULE

CROSS-REFERENCE TO RELATED APPLICATION

This application is based upon and claims priority to Chinese Patent Application 201921355848.0, filed on Aug. 20, 2019, the entire content of which is incorporated herein by reference.

FIELD OF THE DISCLOSURE

The present disclosure relates to the field of optical communication and, more particularly, to an optical module.

BACKGROUND

Rapid development of optical communication and interconnected networks in recent years has been accompanied by soaring increase in user demand for networks, which has led to drastic growth in the traffic on telecommunication backbone networks at a rate of 50% to 80% annually. The transmission speed of optical modules is also growing rapidly to accommodate to the fast development trend in the network market. 100G, 200G, and 400G optical modules have appeared. 800G and even faster optical modules will emerge in the future. The increase in the speed of optical modules will pose major challenges such as the challenge of smaller size. The need to arrange more optical elements in a smaller optical module housing has become a tremendous challenge for the industry.

SUMMARY

Purposes of the present disclosure include providing an optical module having an improved spatial layout that facilitates the realization of a smaller size for the optical module.

To achieve one or more of the aforementioned purposes, one embodiment of the present disclosure provides an optical module. The optical module includes a housing extending in a lengthwise direction, as well as a main circuit board and an optical receiver assembly disposed in the housing. A plane on which the main circuit board is located is parallel to the lengthwise direction of the housing.

The optical receiver assembly includes:
a receiver-end fiber optic port;
at least two sets of receiver-end photoelectronic chips arranged side by side along the lengthwise direction of the housing; and
a receiver-end optical component set for realizing an optical path connection between the receiver-end fiber optic port and the at least two sets of receiver-end photoelectronic chips, the receiver-end optical component set including an optical demultiplexer and at least two coupling components located at an exit end of the optical demultiplexer, the at least two coupling components corresponding to the at least two sets of receiver-end photoelectronic chips, respectively.

The at least two coupling components are arranged side by side along the lengthwise direction of the housing. The at least two coupling components have different distances, respectively, to the plane on which the main circuit board is located along a first direction perpendicular to the plane on which the main circuit board is located.

DETAILED DESCRIPTION

The text below provides a detailed description of the present disclosure with reference to specific embodiments illustrated in the attached drawings. However, these embodiments do not limit the present disclosure. The scope of protection for the present disclosure covers changes made to the structure, method, or function by persons having ordinary skill in the art on the basis of these embodiments.

In order to facilitate the presentation of the drawings in the present disclosure, the sizes of certain structures or portions have been enlarged relative to other structures or portions. Therefore, the drawings in the present application are only for the purpose of illustrating the basic structure of the subject matter of the present application.

Additionally, terms in the text indicating relative spatial position, such as "above," "below," "front," and "rear" are used for explanatory purposes in describing the relationship between a unit or feature depicted in a drawing with another unit or feature therein. Furthermore, although terms such as "first" and "second" are used in the text to describe various elements or structures, the objects described shall not be limited by such terms. Such terms are merely used to distinguish these described objects from each other.

Figure 1:
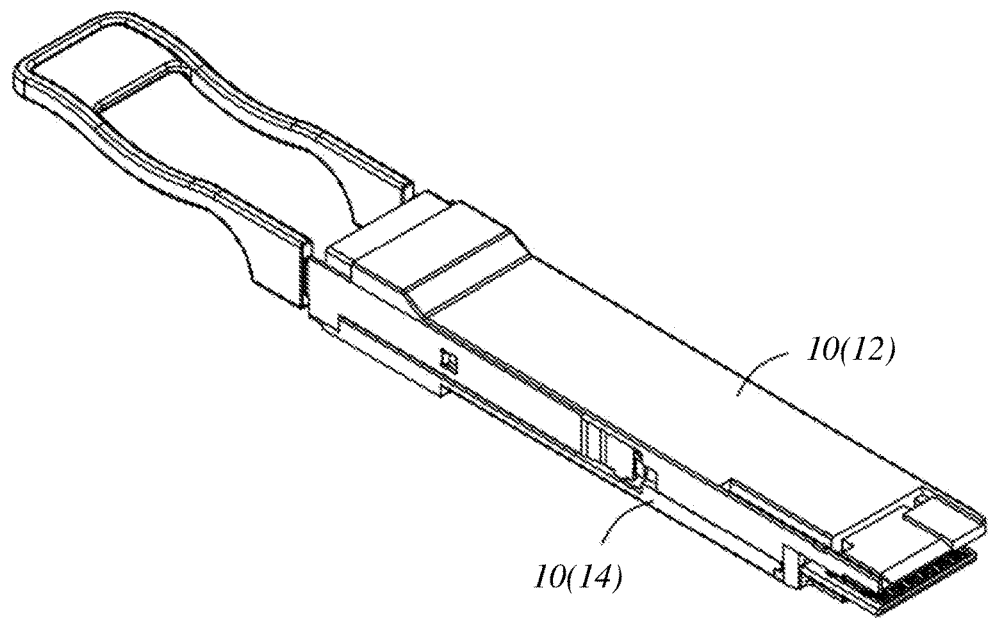
FIG. 1 is a three-dimensional structural view illustrating an optical module according to one embodiment of the present disclosure.
Figure 2:
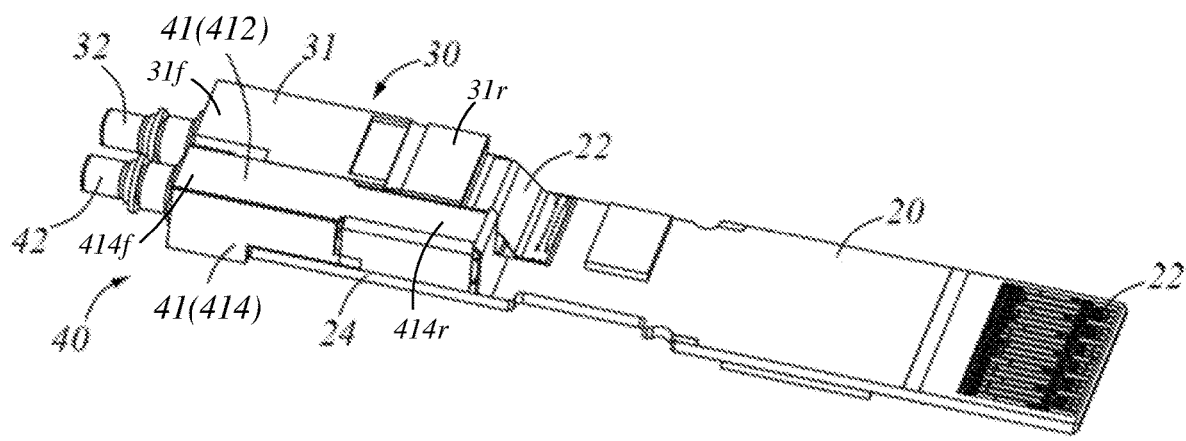
FIG. 2 is a schematic view illustrating an internal structure of the optical module of FIG. 1 with its housing removed.
Figure 3:
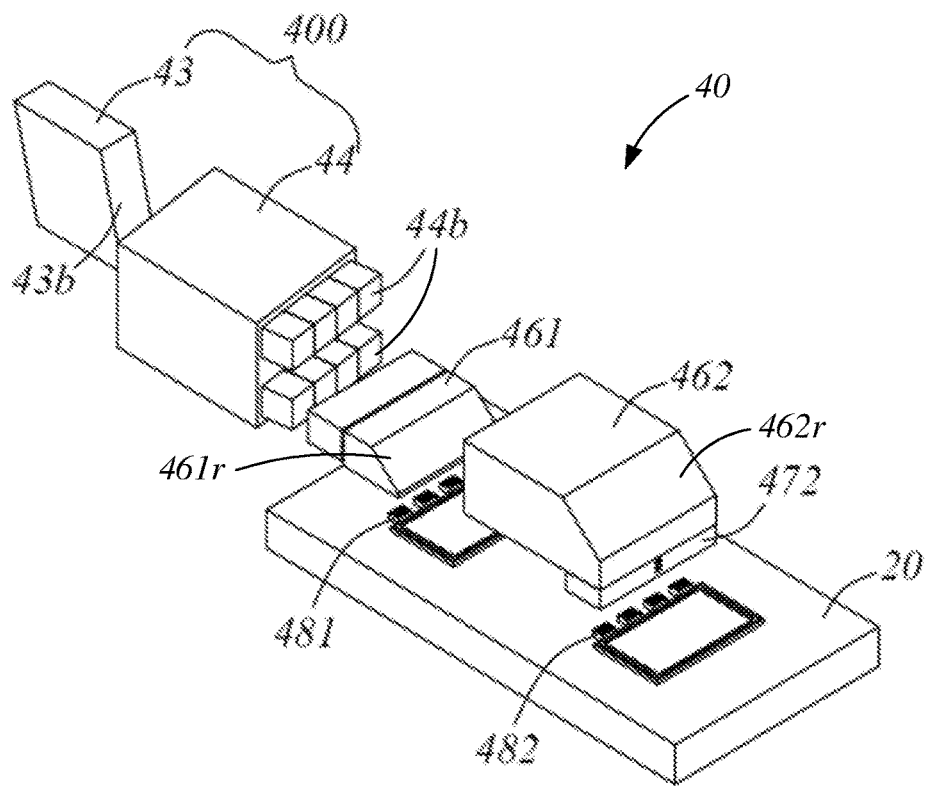
FIG. 3 is a schematic view illustrating a three-dimensional structure of an optical receiver assembly and a main circuit board of the optical module of FIG. 2.
Figure 4:
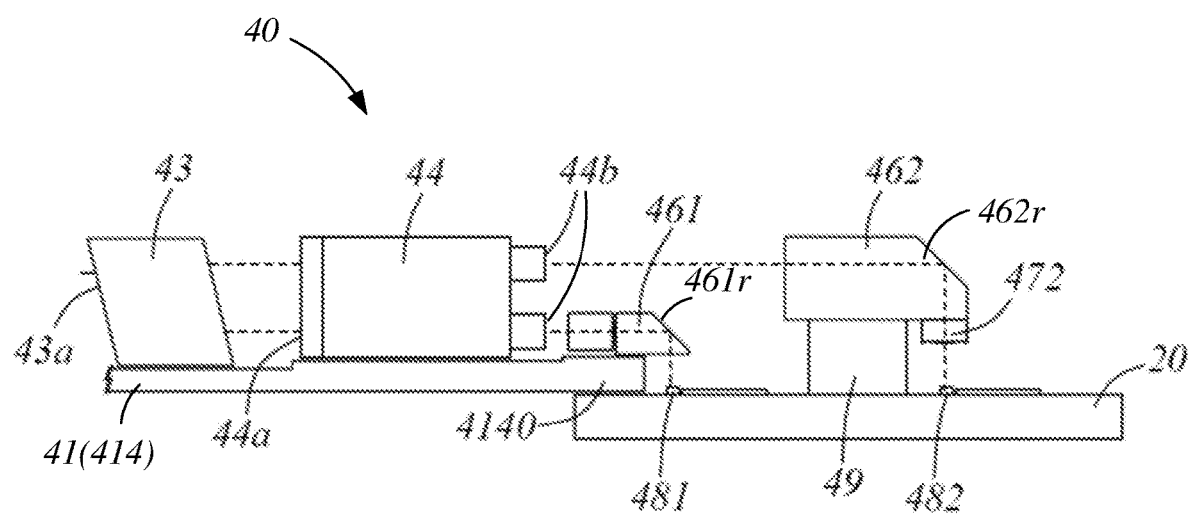
FIG. 4 is a side view illustrating the optical receiver assembly and the main circuit board of the optical module of FIG. 2.

FIG. 1 is a three-dimensional structural view illustrating an optical module 100 according to one embodiment of the present disclosure. FIG. 2 is a schematic view illustrating the internal structure of the optical module 100 of FIG. 1 with its housing removed. FIG. 3 is a schematic view illustrating a three-dimensional structure of an optical receiver assembly 40 and a main circuit board 20 of the optical module 100 of FIG. 2. FIG. 4 is a side view illustrating the optical receiver assembly 40 and the main circuit board 20 of the optical module of FIG. 2. Referring to FIG. 1 and FIG. 2, the optical module 100 includes a housing 10, as well as the main circuit board 20, an optical transmitter assembly 30, and the optical receiver assembly 40 disposed in the housing 10.

The housing 10 extends in a lengthwise direction and includes an upper housing 12 and a lower housing 14. The upper housing 12 and the lower housing 14 are assembled together to accommodate the main circuit board 20, the optical transmitter assembly 30, the optical receiver assembly 40, and other elements of the optical module 100. The main circuit board 20 is a rigid circuit board arranged parallel to a lengthwise direction of the housing 10. A plurality of electrical components are disposed on the main circuit board 20. The plurality of electrical elements include a capacitor, a resistor, and a processor chip, etc. One end 24 of the main circuit board 20 is arranged near the optical transmitter assembly 30 and the optical receiver assembly 40 and may be configured to connect to, and/or be securely assembled to, at least one member of the optical transmitter assembly 30 and the optical receiver assembly 40, as described below. To facilitate description, the end 24 is referred to as an assembly end 24 in the description below. Another end 22 of the main circuit board 20 is configured farther away from the assembly end 24 along the lengthwise direction of the housing 10, and is formed with a gold finger connector for external electrical connection. To facilitate description, the end 22 is referred to as a gold finger end 22 in the description below.

In the present disclosure, to facilitate understanding and description, the direction extending from the assembly end 24 along the lengthwise direction of the housing 10 toward the gold finger end 22 is defined as being from the "front" to the "rear"; in contrast, the direction extending from the gold finger end 22 along the lengthwise direction of the housing 10 toward the assembly end 24 is defined as being from "the rear" to "the front."

Referring to FIG. 2, the optical transmitter assembly 30 is electrically connected to the main circuit board 20 by means of a flexible circuit board 22. The optical transmitter assembly 30 includes a transmitter-end fiber optic port 32, a transmitter-end case body 31, a transmitter-end optical component set, and at least two sets of lasers.

A rear end 31r of the transmitter-end case body 31 is arranged near the main circuit board 20. The transmitter-end fiber optic port 32 is securely assembled to a front end 31f of the transmitter-end case body 31. The transmitter-end fiber optic port 32 is configured to be an interface for connecting the optical module 100 to an external module. The transmitter-end optical component set and the at least two sets of lasers are configured in an empty cavity in the transmitter-end case body 31. Alternatively, the lasers may be configured at another suitable location. The transmitter-end case body 31 may be integrated with the transmitter-end fiber optic port 32. The transmitter-end optical component set, and the at least two sets of lasers form an assembling structure for assembly into the housing 10 of the optical module 100. The transmitter-end case body 31 is connected to the housing 10 by means of a thermally conductive adhesive or a thermally conductive pad to improve heat dissipation performance of the optical transmitter assembly 30.

In one embodiment, the optical transmitter assembly 30 includes two sets of lasers, each set of lasers including four lasers. In other embodiments, the number of sets of lasers and the number of lasers in each set may be adjusted as needed.

The two sets of lasers are arranged in a stacked manner along a first direction (i.e., an up-down direction) perpendicular to the plane on which the main circuit board 20 is located. If "up" and "down" are defined as the relative positions of the upper housing 12 and the lower housing 14, then the two sets of lasers are arranged in an up-down stacked manner. In one embodiment, the four lasers in one of the two sets are arranged side by side along a second direction parallel to the plane on which the main circuit board 20 is located, the second direction being perpendicular to the first direction and the lengthwise direction of the housing 10. To facilitate understanding and description, the second direction may alternatively be defined as a "left-right direction." Thus, the four lasers in one of the two sets are arranged along the left-right direction side by side.

The transmitter-end optical component set is configured to guide lights emitted by the two sets of lasers to the transmitter-end fiber optic port 32. The transmitter-end optical component set primarily includes optical elements such as a prism, a wavelength division multiplexer, and a lens. In comparison with using an optical fiber to connect optical elements, arranging an optical assembly including the transmitter-end optical component set in this way avoids problems associated with fiber optic port connections, including complicated assembly and large space occupied by a large number of ports and separate elements.

Continuing to refer to FIG. 2, the optical receiver assembly 40 and the optical transmitter assembly 30 are arranged along the left-right direction side by side in the housing 10. The optical receiver assembly 40 includes a receiver-end fiber optic port 42, a receiver-end case body 41, a receiver-end optical component set, and at least two sets of receiver-end photoelectronic chips.

The receiver-end case body 41 includes a lower case body 414 and an upper cover body 412. The lower case body 414 and the upper cover body 412 are assembled together for accommodating at least one member of the receiver-end optical component set. The receiver-end fiber optic port 42 is securely assembled to a front end 414f of the lower case body 414. A rear end 414r of the lower case body 414 extends along the lengthwise direction of the housing 10 toward the main circuit board 20. The receiver-end case body may be integrated with the receiver-end fiber optic port 42 and at least a portion of the receiver-end optical component set to form an assembling structure for assembly into the housing 10. In one embodiment, the receiver-end case body is connected to the housing 10 of the optical module 100 by means of a thermally conductive adhesive or a thermally conductive pad to improve heat dissipation performance of the optical receiver assembly 40.

The receiver-end fiber optic port 42 is configured to be an interface for connecting the optical module 100 to an external module. Specifically, the receiver-end fiber optic port 42 is configured to be an interface for connecting the optical receiver assembly 40 to the external module.

The receiver-end photoelectronic chips may include, or be configured to be, photodiodes that convert optical signals to electrical signals. Referring to FIG. 2 through FIG. 4, in the present embodiment, the optical receiver assembly 40 includes two sets of receiver-end photoelectronic chips, each set of receiver-end photoelectronic chips including four receiver-end photoelectronic chips. To facilitate description, the four receiver-end photoelectronic chips in a first set are labeled "481," and the four receiver-end photoelectronic chips in a second set are labeled "482." The first set of receiver-end photoelectronic chips 481 and the second set receiver-end photoelectronic chips 482 are arranged sequentially along the lengthwise direction of the housing 10. Specifically, in the present embodiment, the first set of receiver-end photoelectronic chips 481 is arranged closer to a front side of the housing 10, and the second set of receiver-end photoelectronic chips 482 is arranged closer to a rear side of the housing 10. In another embodiment, the number of sets of receiver-end photoelectronic chips and the number of receiver-end photoelectronic chips in each set may be adjusted as needed.

The receiver-end optical component set is configured to realize an optical path connection between the receiver-end fiber optic port 42 and the first set of receiver-end photoelectronic chips 481, and to realize an optical path connection between the receiver-end fiber optic port 42 and the second set of receiver-end photoelectronic chips 482, thereby guiding a light transmitted from the receiver-end fiber optic port 42 to the first set of receiver-end photoelectronic chips 481 and the second set of receiver-end photoelectronic chips 482.

The receiver-end optical component set includes a collimating prism, a periscope located at an exit end of the collimating prism, an optical demultiplexer 400 located at an exit end of the periscope, and two coupling components 461 and 462 located at an exit end of the optical demultiplexer 400. In the present embodiment, the number of the coupling components 461 and 462 is configured to be two so that the two coupling components 461 and 462 correspond respectively to the two sets of receiver-end photoelectronic chips 481 and 482. Specifically, the coupling components 461 and 462 include the first coupling component 461 corresponding to the first set of receiver-end photoelectronic chips 481, and the second coupling component 462 corresponding to the second set of receiver-end photoelectronic chips 482. In another embodiment, if the number of sets of receiver-end photoelectronic chips is adjusted as needed, then the number of coupling components is adjusted accordingly.

The first coupling component 461 and the second coupling component 462 are arranged in the front-rear direction side by side along the lengthwise direction of the housing 10. Specifically, the first coupling component 461 is arranged closer to the front side of the housing 10, and the second coupling component 462 is arranged closer to the rear side of the housing 10. The distances along the first direction (i.e., the up-down direction) from the first coupling component 461 and the second coupling component 462 to the plane on which the main circuit board 20 is located, respectively, are different. Specifically, the first coupling component 461 is closer in the first direction to the plane on which the main circuit board 20 is located (i.e., the distance is relatively small), and the second coupling component 462 is farther in the first direction from the plane on which the main circuit board 20 is located (i.e., the distance is relatively large). Thus, by arranging the first coupling component 461 and the second coupling component 462 in a staggered manner at different heights along the up-down direction (i.e., the first direction), the respective projections of the first coupling component 461 and the second coupling component 462 along the lengthwise direction do not overlap, and the first coupling component 461 and the second coupling component 462 form a step structure. As a result, more elements can be arranged in a limited space, thereby realizing high density layout, saving substantial space, and facilitating an increase in the transmission speed of the optical module.

Furthermore, the first set of receiver-end photoelectronic chips 481 and the second set of receiver-end photoelectronic chips 482 are both securely assembled to an upper surface of the main circuit board 20. The first set of receiver-end photoelectronic chips 481 and the second set of receiver-end photoelectronic chips 482 may be electrically connected to a circuit in the main circuit board 20. The first coupling component 461 is stacked above the first set of receiver-end photoelectronic chips 481 and is configured to guide a portion of an exit light coming from the optical demultiplexer 400 downward into the first set of receiver-end photoelectronic chips 481. In some embodiments, the first coupling component 461 includes a first mirror and a first coupling lens secured onto the first mirror. Similarly, the second coupling component 462 is stacked above the second set of receiver-end photoelectronic chips 482 and is configured to guide another portion of the exit light coming from the optical demultiplexer 400 downward into the second set of receiver-end photoelectronic chips 482. In some embodiments, the second coupling component 462 includes a second mirror and a second coupling lens 472 secured below the second mirror. Here, the focal lengths of the first coupling lens and the second coupling lens 472 are configured to be different. The first coupling component 461 is closer in the first direction to the plane on which the main circuit board 20 is located. The focal length of the first coupling lens is smaller than the focal length of the second coupling lens 472.

Furthermore, the first coupling component 461 and the second coupling component 462 are securely assembled onto different support mechanisms, respectively. Therefore, the first coupling component 461 and the second coupling component 462 do not need to be assembled simultaneously and are instead securely assembled separately and independently, thus making coupling less difficult and avoiding coupling errors that result from the assembly.

Specifically, the support mechanism corresponding to the second coupling component 462 includes a support piece 49 that is supported by the upper surface of the main circuit board 20. The support piece 49 is arranged in front of the second set of receiver-end photoelectronic chips 482. The second coupling component 462 is securely assembled to the upper surface of the main circuit board 20 by means of the support piece 49. A rear end 462r of the second coupling component 462 extends beyond the rear of the support piece 49 to facilitate the exposure of the rear end 462r above the second set of receiver-end photoelectronic chips 482. In one embodiment, the support piece 49 includes a glass block.

The support mechanism corresponding to the first coupling component 461 includes the receiver-end case body 41. Specifically, the rear end 414r of the lower case body 414 of the receiver-end case body includes a base plate 4140 parallel to the plane on which the main circuit board 20 is located. The base plate 4140 and the main circuit board 20 are arranged in a stacked manner in the first direction (the up-down direction). In other words, the projections of the base plate 4140 and the main circuit board 20 along the first direction overlap. The base plate 4140 is stacked above the assembly end 24 of the main circuit board 20 and is located in front of the first set of receiver-end photoelectronic chips 481. The first coupling component 461 is securely assembled onto the base plate 4140. A rear end 461b of the first coupling component 461 extends beyond the rear of the base plate 4140 to facilitate the exposure of the rear end 461b above the first set of receiver-end photoelectronic chips 481.

Furthermore, in the present embodiment, the four receiver-end photoelectronic chips 481 in the first set of receiver-end photoelectronic chips 481 are arranged side by side along the second direction (the left-right direction). Similarly, the four receiver-end photoelectronic chips 482 in the second set of receiver-end photoelectronic chips 482 are arranged side by side along the second direction.

Accordingly, the optical demultiplexer 400 is configured to separate a light beam containing a plurality of frequency bands (hereinafter referred to as "bands") into a plurality of separated light beams. In the present embodiment, the optical demultiplexer 400 is configured to separate the light beam containing eight (8) bands into eight (8) separated light beams each having a different band. Specifically, the optical demultiplexer 400 includes a first optical demultiplexing element 43 and a second optical demultiplexing element 44 arranged sequentially along a propagation direction of the optical path.

The first optical demultiplexing element 43 is configured to separate the light beam containing eight (8) bands into two separated light beams each containing four (4) bands. In greater detail, the first optical demultiplexing element 43 includes a multi-band light beam incident surface 43a and two multi-band separated light beam exit surfaces 43b. The two multi-band separated light beam exit surfaces 43b are formed on a same surface of the first optical demultiplexing element 43. In FIG. 3, only one of the two multi-band separated light beam exit surfaces 43b is labeled. The light beam containing eight (8) bands can enter the first optical demultiplexing element 43 through the multi-band light beam incident surface 43a and become two separated light beams each containing four (4) bands. Next, one of the two separated light beams each containing four (4) bands exits one of the two multi-band separated light beam exit surfaces 43b, and the other one of the two separated light beams each containing four (4) bands exits the other one of the two multi-band separated light beam exit surfaces 43b. The two multi-band separated light beam exit surfaces 43b are configured on the same surface of the first optical demultiplexing element 43 in an up-down manner along the first direction. For example, the two multi-band separated light beam exit surfaces 43b may respectively belong to two components that are stacked together. As another example, the two multi-band separated light beam exit surfaces 43b may be formed by forming different thin films at different locations on the same surface of the first optical demultiplexing element 43.

In the present embodiment, the number of the multi-band separated light beam exit surfaces 43b is configured to be two so that the two multi-band separated light beam exit surfaces 43b correspond respectively to the two sets of receiver-end photoelectronic chips 481 and 482. In another embodiment, if the number of sets of receiver-end photoelectronic chips is adjusted as needed, then the number of multi-band separated light beam exit surfaces 43b is adjusted accordingly.

The second optical demultiplexing element 44 is configured to separate each of the two separated light beams each containing four (4) bands into four sub light beams each containing one (1) band. In greater detail, the second optical demultiplexing element 44 includes a multi-band separated light beam incident surface 44a and two sets of single-band sub light beam exit surfaces 44b. The multi-band separated light beam incident surface 44a is configured on a surface of the second optical demultiplexing element 44. The two sets of single-band sub light beam exit surfaces 44b are arranged in an up-down manner along the first direction, each set having four single-band sub light beam exit surfaces 44b arranged side by side along the left-right direction (i.e., the second direction). Taking one of the two separated light beams each containing four bands for example: the separated light beam containing four bands enters the second optical demultiplexing element 44 through the multi-band separated light beam incident surface 44a and becomes four sub light beams each containing one (1) band; next, each of the four sub light beams each containing one (1) band exits its corresponding single-band sub light beam exit surface 44b.

In the present embodiment, the number of the multi-band separated light beam incident surface 44a is configured to be one, the number of the sets of single-band sub light beam exit surfaces 44b is configured to be two, and the number of the single-band sub light beam exit surfaces 44b in each set is four. This configuration corresponds to the number of sets of receiver-end photoelectronic chips and the number of receiver-end photoelectronic chips in each set. In another embodiment, if the number of sets of receiver-end photoelectronic chips and the number of receiver-end photoelectronic chips in each set are adjusted as needed, then the number of multi-band separated light beam incident surface 44a, the number of sets of single-band sub light beam exit surfaces 44b, and the number in each set are adjusted accordingly.

Furthermore, the optical demultiplexer 400 is securely assembled onto the lower case body 414 of the receiver-end case body. The first optical demultiplexing element 43 and the second optical demultiplexing element 44 are spaced from each other and independently arranged. The first optical demultiplexing element 43 is securely assembled to the lower case body 414, and the second optical demultiplexing element 44 is securely assembled to the lower case body 414. By independently assembling and securing the first optical demultiplexing element 43 and the second optical demultiplexing element 44, optical alignment during assembly is easier, assembly is more convenient, and spatial layout is facilitated.

In summary, compared with currently available technology, the optical module 100 according to the embodiment of the present disclosure provides the following benefits.

First, by arranging the first coupling component 461 and the second coupling component 462 in a staggered way at different heights along the first direction (i.e., the up-down direction), the respective projections of the first coupling component 461 and the second coupling component 462 are not overlapping along the lengthwise direction, and the first coupling component 461 and the second coupling component 462 form a step structure. As a result, more elements can be arranged in a limited space, thereby realizing high density layout and saving substantial space, which resolves a technical challenge in high-speed transmission for an optical module and enables manufacturing of high-speed optical modules.

Second, by securely assembling the first coupling component 461 and the second coupling component 462 onto different support mechanisms, respectively, the first coupling component 461 and the second coupling component 462 do not need to be assembled simultaneously and are instead securely assembled separately and independently, thus making coupling less difficult and avoiding coupling errors that result from the assembly.

Third, by spacing apart and independently installing and securing the first optical demultiplexing element 43, the second optical demultiplexing element 44, the first coupling component 461, the second coupling component 462, etc. from each other, optical alignment during assembly is easier, assembly is more convenient, and spatial layout is facilitated.

It should be understood that despite the descriptions of embodiments in the specification, each embodiment does not entail only one independent technical solution. The specification is written in this way simply for the sake of clarity. Persons having ordinary skill in the art should treat the specification as a whole; the technical solutions in the embodiments may be combined in appropriate ways to form other embodiments that may be understood by persons having ordinary skill in the art.

The series of detailed descriptions above is only intended to provide specific descriptions of feasible embodiments of the present disclosure. They are not to be construed as limiting the scope of protection for the present disclosure; all equivalent embodiments or changes that are not detached from the techniques of the present disclosure in essence should fall under the scope of protection of the present disclosure.

What is claimed is:

1. An optical module, comprising:
a housing extending in a lengthwise direction;

a main circuit board and an optical receiver assembly disposed in the housing, a plane on which the main circuit board is located being parallel to the lengthwise direction of the housing, wherein the optical receiver assembly comprises:

a receiver-end fiber optic port;

at least two sets of receiver-end photoelectronic chips arranged side by side along the lengthwise direction of the housing with respect to each other; and a receiver-end optical component set for realizing an optical path connection between the receiver-end fiber optic port and the at least two sets of receiver-end photoelectronic chips, the receiver-end optical component set comprising an optical demultiplexer and at least two coupling components located at an exit end of the optical demultiplexer, the at least two coupling components corresponding to the at least two sets of receiver-end photoelectronic chips, respectively, the at least two coupling components arranged side by side along the lengthwise direction of the housing with respect to each other, and having different distances, respectively, to the plane on which the main circuit board is located along a first direction perpendicular to the plane on which the main circuit board is located, wherein the at least two coupling components includes at least a first coupling component and a second coupling component, the optical demultiplexer, the first coupling component, and the second coupling component being arranged along the lengthwise direction of the housing with respect to one another.

2. The optical module of claim 1, wherein projections of the at least two coupling components along the lengthwise direction of the housing do not overlap.

3. The optical module of claim 1, wherein:

the at least two sets of receiver-end photoelectronic chips are assembled onto the main circuit board, and the at least two coupling components and the receiver-end photoelectronic chips that correspond to the at least two coupling components are arranged in a stacked manner along the first direction and located on a same side of the main circuit board.

4. The optical module of claim 1, wherein the at least two coupling components are securely assembled onto different support mechanisms, respectively.

5. The optical module of claim 4, wherein:

the support mechanism corresponding to at least one of the at least two coupling components includes a support piece disposed on the main circuit board, the receiver-end optical component set further comprises a receiver-end case body to which an optical demultiplexer is secured, and the support mechanism corresponding to at least another one of the at least two coupling components includes the receiver-end case body.

6. The optical module of claim 5, wherein the support piece is configured to be a glass block located between two sets of the receiver-end photoelectronic chips, the at least one of the at least two coupling components being secured onto the support piece and extending beyond the support piece along the lengthwise direction of the housing.

7. The optical module of claim 5, wherein:

the receiver-end case body comprises a first end to which the receiver-end fiber optic port is securely assembled and a second end configured opposite to the first end along the lengthwise direction of the housing, the second end comprising a base plate parallel to the plane on which the main circuit board is located, and the base plate and the main circuit board are arranged in a stacked manner along the first direction, the at least another one of the at least two coupling components being securely assembled to the base plate.

8. The optical module of claim 5, wherein:

the optical demultiplexer comprises a first optical demultiplexing element and a second optical demultiplexing element arranged sequentially along a propagation direction of an optical path, and the first optical demultiplexing element and the second optical demultiplexing element are spaced from each other and are securely assembled to the receiver-end case body respectively.

9. The optical module of claim 8, wherein:

the first optical demultiplexing element comprises a multi-band light beam incident surface and at least two multi-band separated light beam exit surfaces, the second optical demultiplexing element comprises a multi-band separated light beam incident surface and at least two sets of single-band sub light beam exit surfaces, and the at least two multi-band separated light beam exit surfaces are arranged sequentially along the first direction, and the at least two sets of single-band sub light beam exit surfaces are arranged sequentially along the first direction.

10. The optical module of claim 1, wherein one of the at least two coupling components comprises a mirror and a coupling lens secured onto the mirror.

* * * * *